US011412721B2

(12) United States Patent
Joye et al.

(10) Patent No.: US 11,412,721 B2
(45) Date of Patent: Aug. 16, 2022

(54) EASY RIG BAIT TACKLE

(71) Applicants: Darrell Andrew Joye, Pawley's Island, SC (US); Robert Pickney Elliott, Sumter, SC (US); Michael Carter Gibson, Gainsville, GA (US)

(72) Inventors: Darrell Andrew Joye, Pawley's Island, SC (US); Robert Pickney Elliott, Sumter, SC (US); Michael Carter Gibson, Gainsville, GA (US)

( * ) Notice: Subject to any disclaimer, the term of this patent is extended or adjusted under 35 U.S.C. 154(b) by 226 days.

(21) Appl. No.: 16/654,591

(22) Filed: Oct. 16, 2019

(65) Prior Publication Data

US 2021/0112793 A1 Apr. 22, 2021
US 2022/0087238 A9 Mar. 24, 2022

Related U.S. Application Data

(60) Provisional application No. 62/767,784, filed on Nov. 15, 2018.

(51) Int. Cl.
*A01K 83/06* (2006.01)
*A01K 91/04* (2006.01)

(52) U.S. Cl.
CPC .............. *A01K 83/06* (2013.01); *A01K 91/04* (2013.01)

(58) Field of Classification Search
CPC ........ A01K 83/06; A01K 91/03; A01K 91/04; Y10T 24/4544; F16B 45/04
USPC ..... 43/42.37, 42.38, 43.1, 43.16, 44.2, 44.4, 43/44.8, 44.83, 44.86
See application file for complete search history.

(56) References Cited

U.S. PATENT DOCUMENTS

| 952,615 | A | * | 3/1910 | Harkins | ................. | A01K 91/04 43/44.86 |
| 1,779,343 | A | * | 10/1930 | Sylvanne | ............... | A01K 91/03 24/600.4 |
| 2,062,245 | A | * | 11/1936 | Arens | .................... | A01K 91/04 24/601.8 |
| 2,157,333 | A | | 5/1937 | Hadaway | | |
| 2,397,968 | A | * | 4/1946 | Lind | ...................... | A01K 85/10 24/600.4 |

(Continued)

FOREIGN PATENT DOCUMENTS

GB 1573866 A * 8/1980 ............ A01K 93/00
KR 200468860 Y1 * 9/2013

OTHER PUBLICATIONS

English-language translation of KR 200468860 Y1 (Year: 2013).*

*Primary Examiner* — Lisa L Tsang
(74) *Attorney, Agent, or Firm* — R. K Merting, LLC; Robert K. Merting

(57) ABSTRACT

A novel fishing tackle rig generally consisting of an open-eye formed by double "U" bends on the shaft of a hook or other tackle, a hook-shield which threads onto a fishing line with a hollow rear section to slide over the open-eye, a solid front section to provide structure, and a pin extending perpendicular to secure the hook-shield to the bait, and a cone shaped bait protecting device where the narrow end threads onto the fishing line and the wide end fits over the bait and other components of fishing tackle holding everything together. In an alternative embodiment, the hook-shield is replaced by integrating onto the shaft of the hook or other tackle a closing mechanism that slides along the shaft from an open position to a closed position that completes the open-eye.

4 Claims, 8 Drawing Sheets

(56) References Cited

U.S. PATENT DOCUMENTS

| | | | |
|---|---|---|---|
| 2,518,593 A | 4/1947 | Bell | |
| 2,756,478 A * | 7/1956 | Morrissey | A01K 91/03 24/601.1 |
| 2,784,519 A * | 3/1957 | Ralston | A01K 91/04 43/44.98 |
| 2,876,582 A * | 3/1959 | Schmidt | A01K 93/00 43/44.95 |
| 3,091,885 A | 6/1963 | Ulsh | |
| 3,184,880 A * | 5/1965 | Ratte | A01K 91/04 43/44.86 |
| 3,293,791 A * | 12/1966 | Hinkson | A01K 83/06 43/44.4 |
| 3,724,116 A | 4/1973 | Lindner | |
| 3,760,529 A | 9/1973 | Hicks | |
| 3,893,255 A | 7/1975 | Hicks | |
| 3,897,647 A | 8/1975 | Black | |
| 4,030,225 A | 6/1977 | Earley | |
| 4,133,132 A | 1/1979 | Ellis | |
| 4,205,479 A | 6/1980 | Bjorshol | |
| 4,471,558 A * | 9/1984 | Garcia | A01K 83/06 43/44.4 |
| 5,893,323 A | 4/1999 | Horton | |
| 5,970,650 A * | 10/1999 | Mammel | A01K 83/00 43/43.16 |
| 6,314,673 B1 * | 11/2001 | Matteoli | A01K 91/03 43/43.12 |
| 6,516,552 B2 * | 2/2003 | Hawkins | A01K 85/00 43/42.09 |
| 6,560,916 B1 * | 5/2003 | Maxim | A01K 83/00 43/43.16 |
| 6,708,442 B2 | 3/2004 | Kress | |
| 7,257,923 B1 | 8/2007 | Urbano, Jr. | |
| 7,950,180 B2 * | 5/2011 | Hatfield | A01K 83/00 43/43.12 |
| 8,024,887 B2 | 9/2011 | Milanowski | |
| 8,695,180 B2 * | 4/2014 | Delle Donne | A01K 93/02 24/600.4 |
| 9,044,000 B1 | 6/2015 | Lumsden | |
| 9,288,970 B1 * | 3/2016 | Washington | A01K 83/06 |
| 2003/0159328 A1 | 8/2003 | Acker | |
| 2004/0010959 A1 | 1/2004 | Kress | |
| 2013/0008077 A1 * | 1/2013 | Koch-Schmidt | A01K 95/02 43/44.87 |

\* cited by examiner

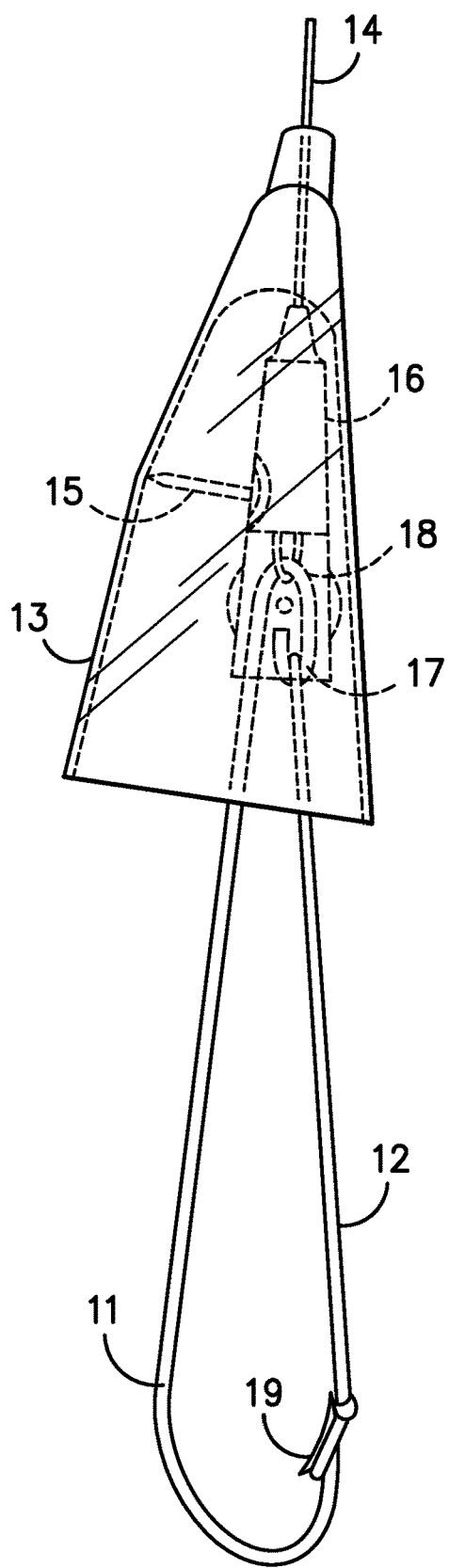
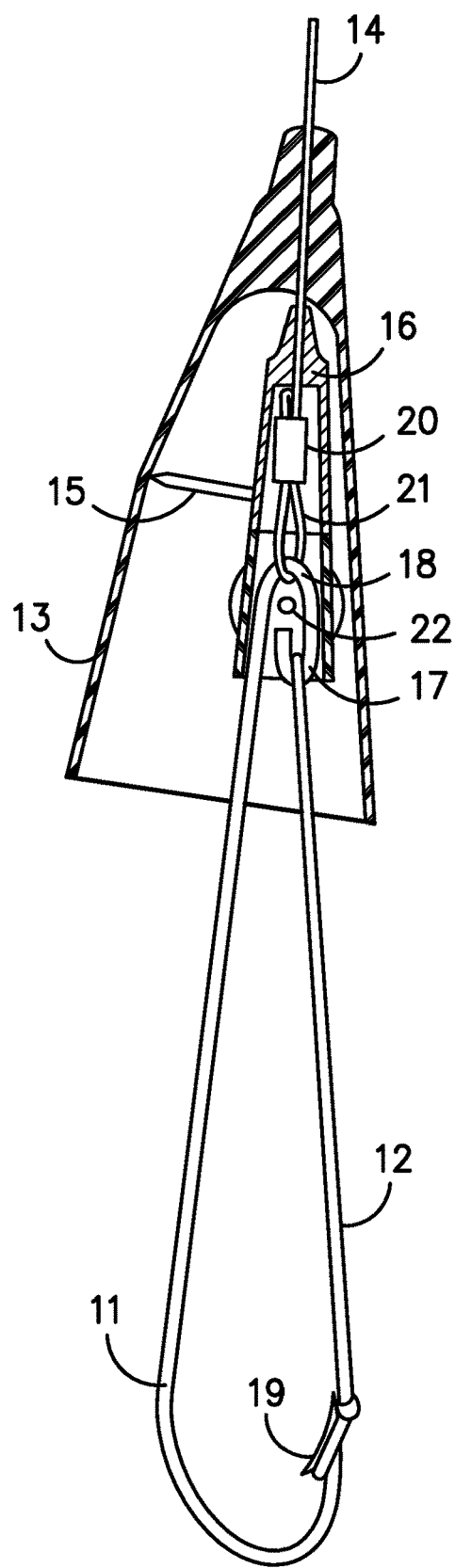
FIG. -1-  FIG. -2-

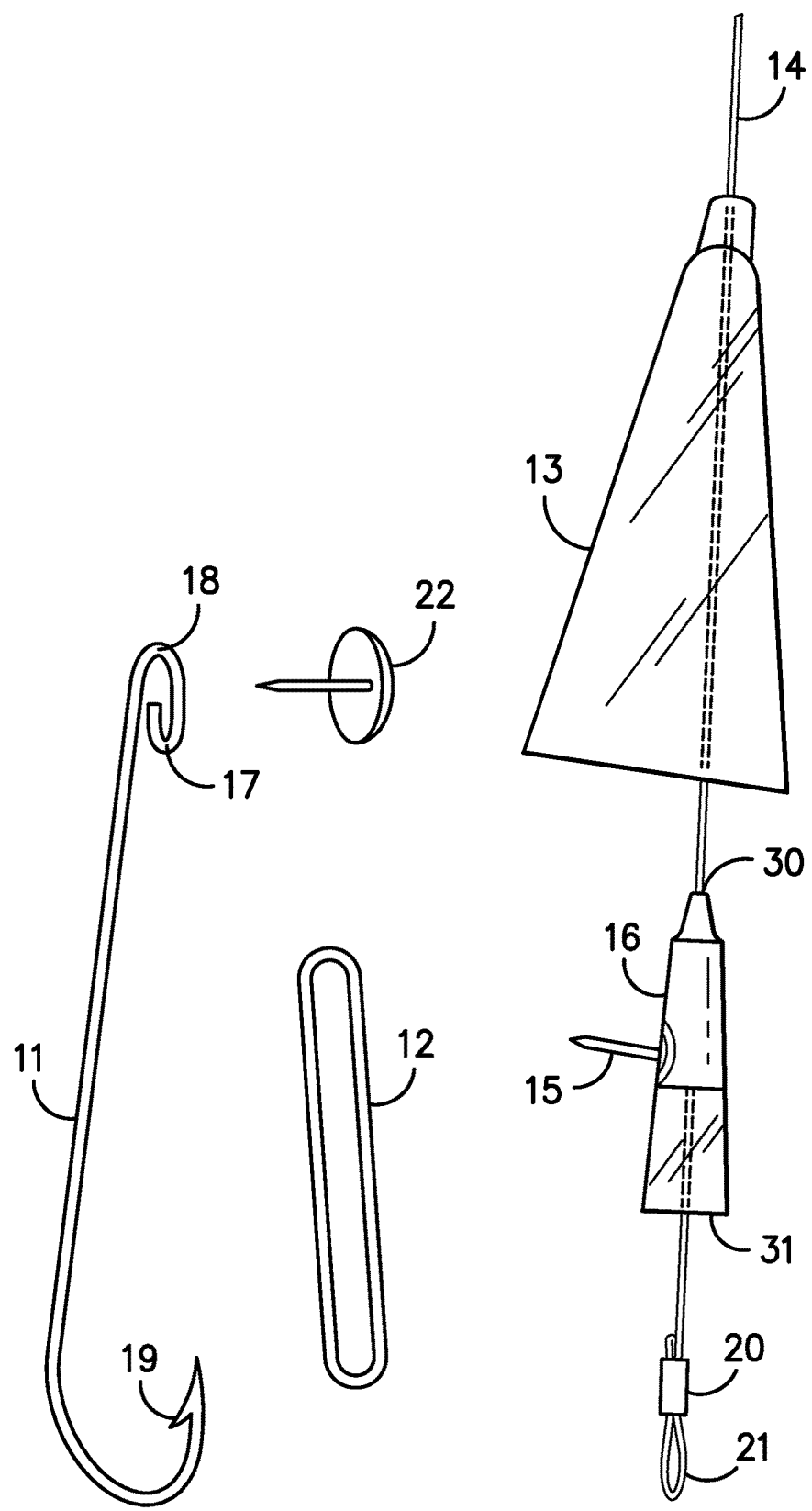
FIG. -3-

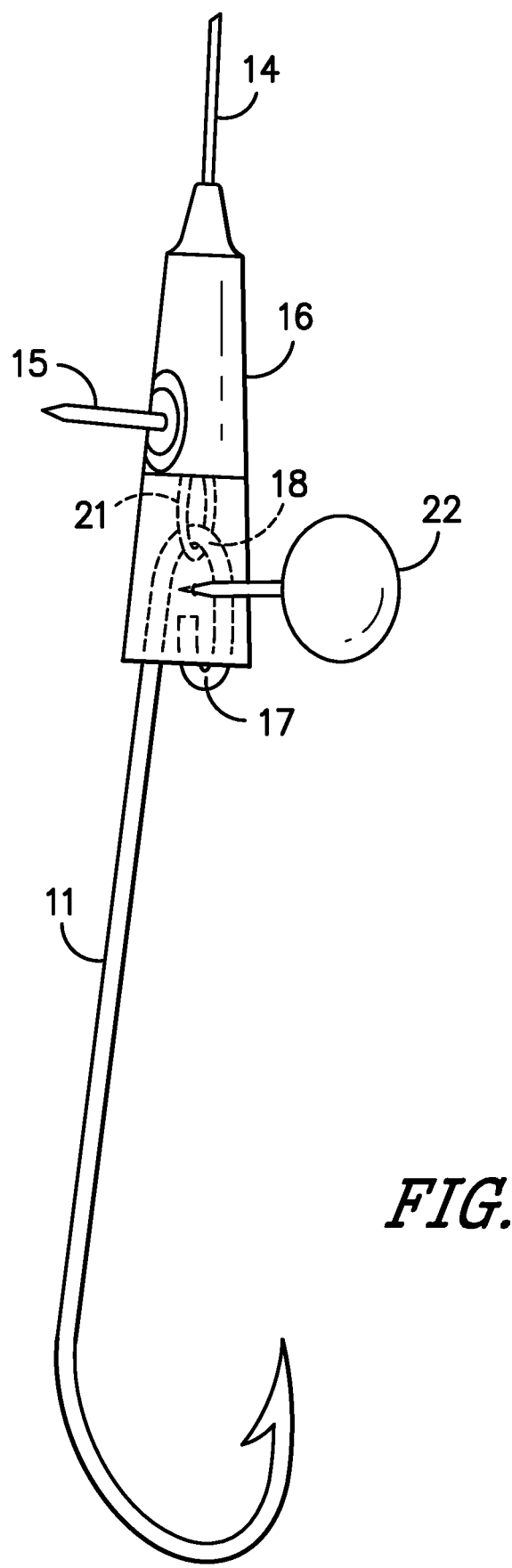
FIG. -4-

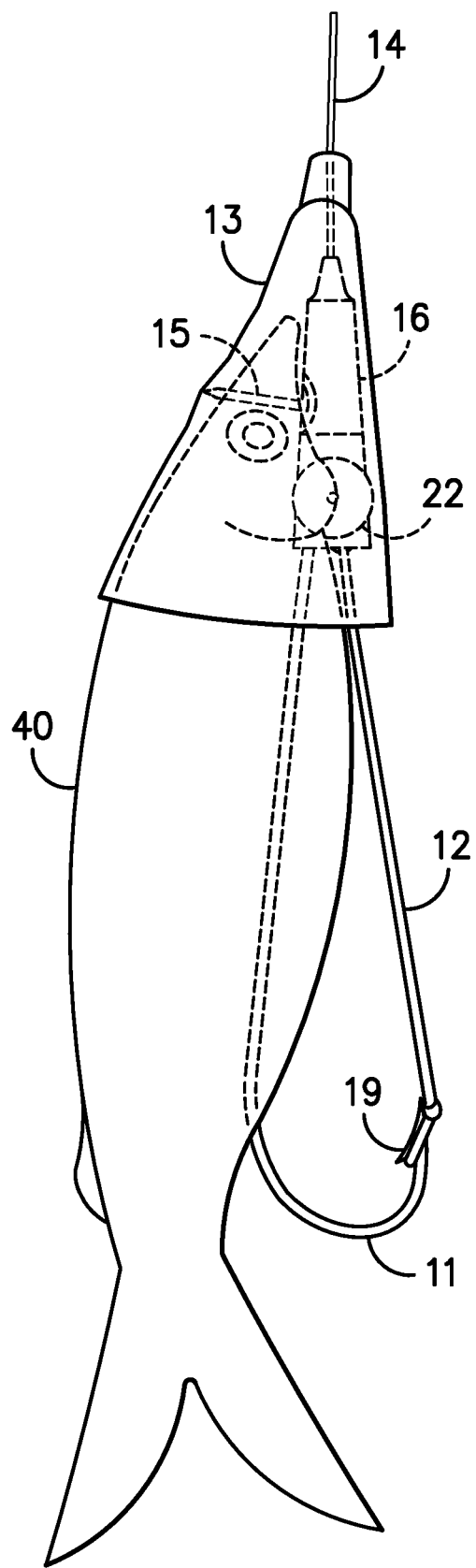
FIG. -5-

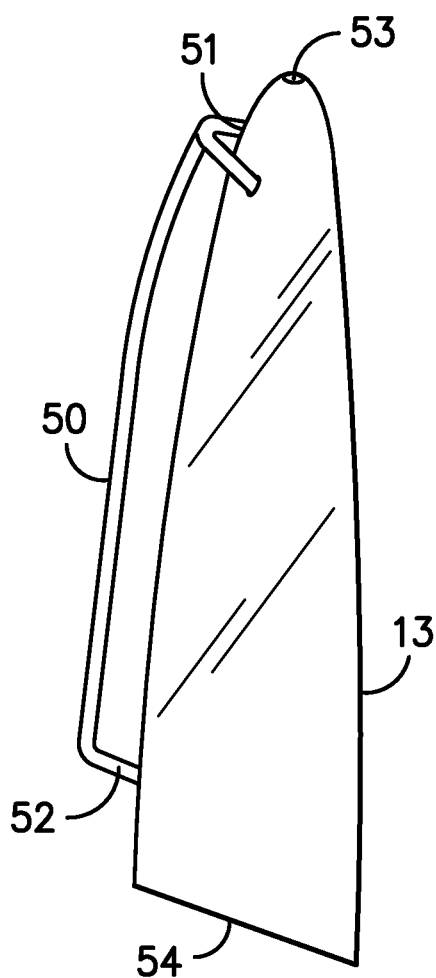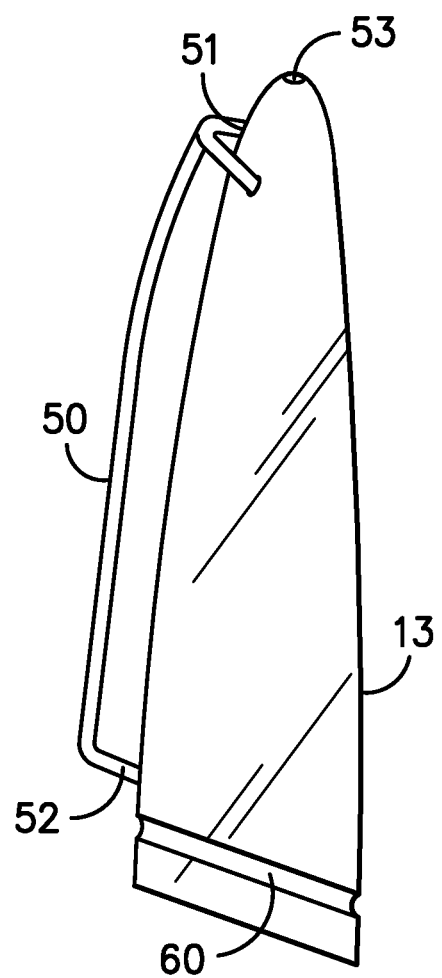
FIG. -6-  FIG. -7-

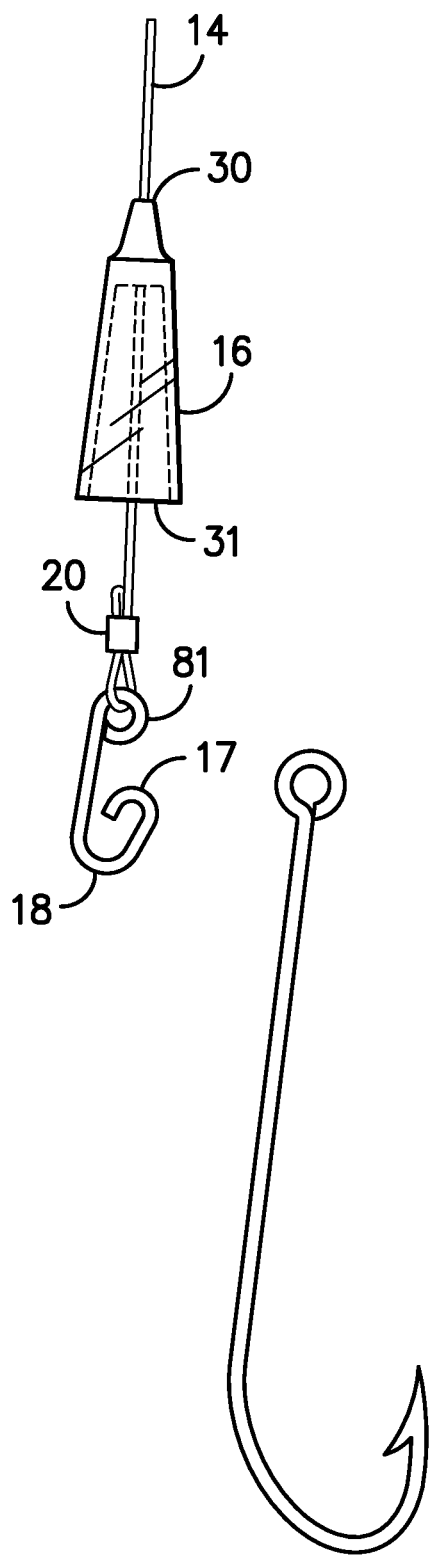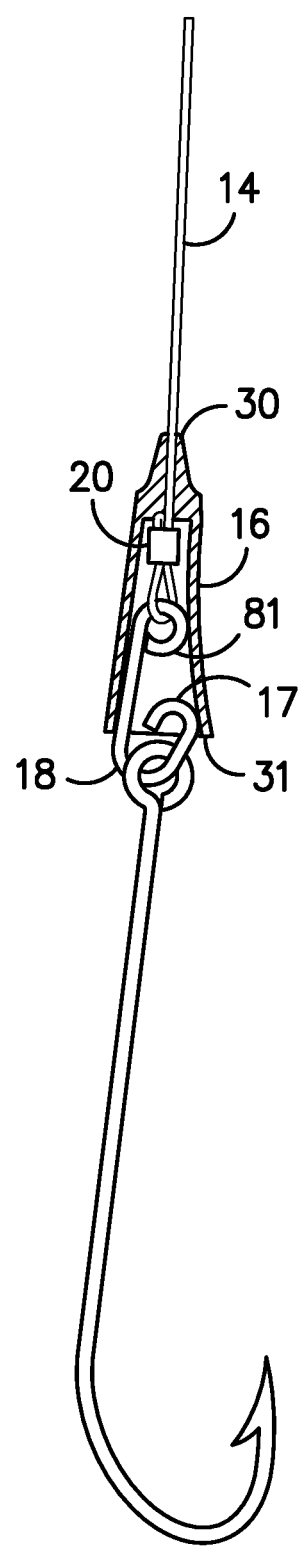
FIG. -8-  FIG. -9-

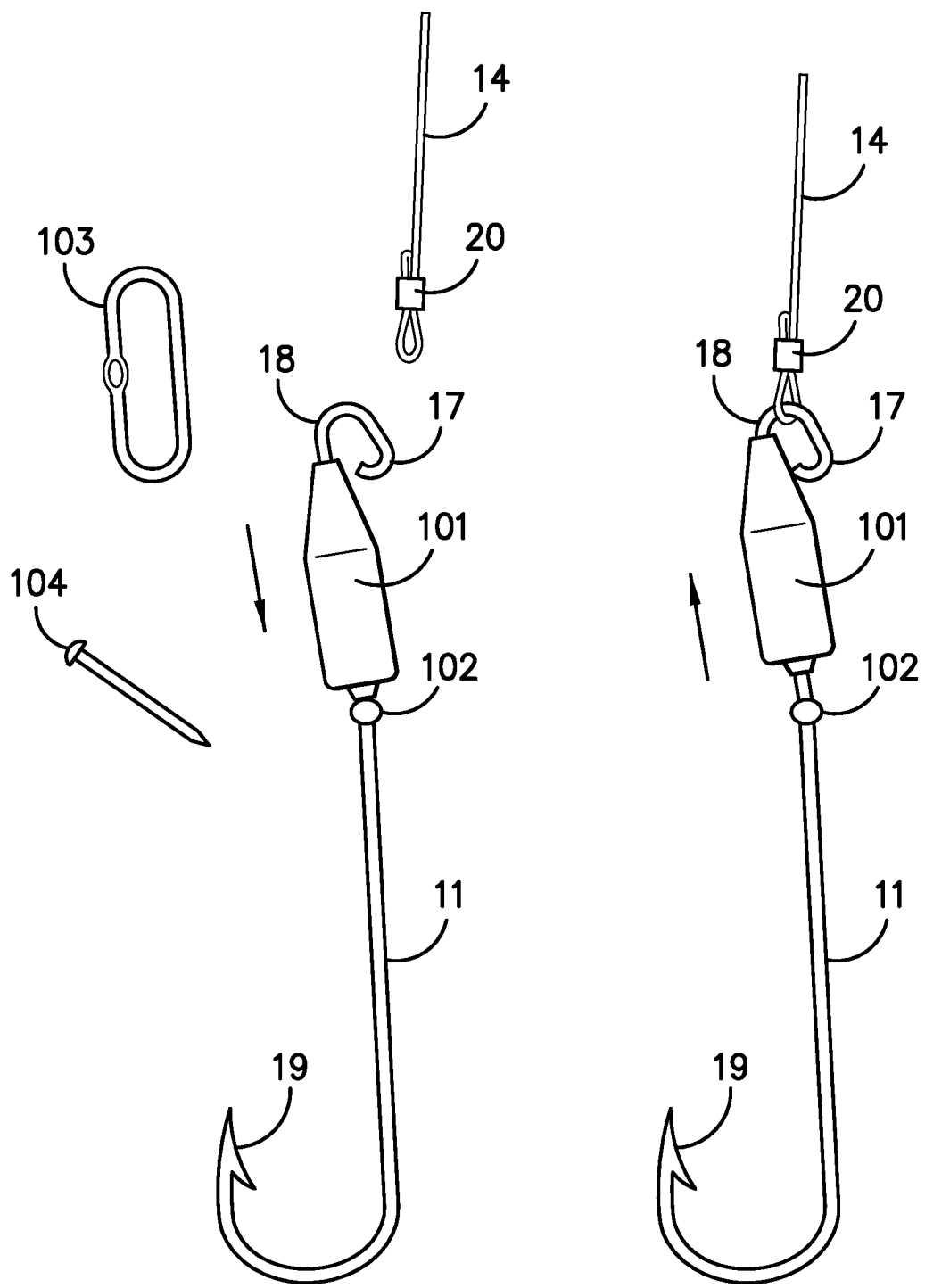
FIG. -10-   FIG. -11-

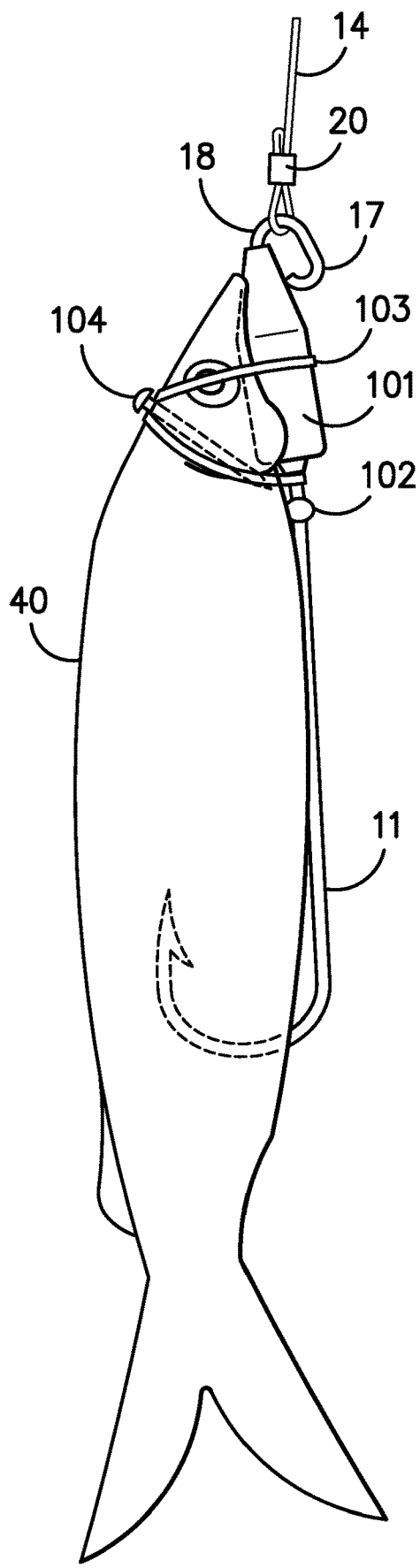
FIG. -12-

EASY RIG BAIT TACKLE

CROSS REFERENCE TO RELATED APPLICATIONS (ORIGINAL)

This application claims the benefit of provisional patent application Ser. No. 62/767,784 filed Nov. 15, 2018.

DESCRIPTION (ORIGINAL)

Field of the Invention

The present invention relates to fishing tackle for the presentation of dead or artificial bait. More particularly, the invention relates to a hook attachment device and protective covering designed to allow for easy attachment of a minnow to a fishing line and to protect said minnow from premature damage caused by trolling.

Related Art

For hundreds of years man has sought more efficient equipment to capture fish. As mankind has progressed, sportsmen emerged who fish for the joy of the activity and not for livelihood. Still, sportsmen strive to find better ways to catch fish even when practicing catch and release.

With the advent of modern fishing through the use of a pole and line came a demand for tackle to connect bait and hooks to the line. At first man had to tie each hook or piece of tackle directly to the line. This proved cumbersome and time consuming, and man sought other ways to attach line to tackle.

The accepted modern method of attaching line to tackle is through a snap-swivel. One end of the snap-swivel is permanently attached to the line by a knot. The other end, much like a safety-pin, can be opened, another line, ring, or hook attached, and then closed. While the snap-swivel solves the necessity for a quick detachable mechanism, it introduces another piece of moving hardware and a failure point for sportsmen.

A further challenge for sportsmen has been the presentation of a substitute for live bait. Live bait is recognized as the most effective bait, but maintaining said bait in a lively condition is challenging. This is especially true for some species of minnows that are particularly delicate.

An obvious solution to said problem is the use of deceased "live bait", and a second alternative is the use of artificial baits designed to look like a live bait of choice. Both solutions present the challenge of accurate presentation of the deceased or artificial bait in a life like manner. If a hook is placed into the deceased or artificial bait incorrectly, the bait will be off balance and will spin in a most unnatural presentation. Therefore, experience and skill is required in threading a hook through the deceased or artificial bait. The more complicated the tackle, the more skill is required to properly hook the bait.

The use of deceased "live bait" is further troubled by the delicate nature of some natural baits that are prone to deterioration during casting, trolling, or other normal acts of fishing.

Therefore a need exists for tackle that allows the sportsmen to easily hook deceased or artificial bait in a balanced manner, to quickly attach said hook to the line, and that protects said bait from deterioration through trolling, casting, or other normal acts of fishing. This invention answers these needs with minimal tackle and failure points.

BRIEF SUMMARY OF THE INVENTION (ORIGINAL)

In one embodiment of the present invention a fishing tackle rig consists of a double-looped open-eye hook, a hollow hook-shield with bait holding pin, and a bait protecting cover. In another embodiment, the hollow hook-shield can be eliminated by integrating onto the shaft of the open-eye hook a closing mechanism that engages with the open-eye to close the open-eye.

The Easy Rig Bait Tackle is assembled by first inserting the hook into the bait. Where the bait is a minnow, the open-eye may be inserted up the vent and out a point located centrally between the lower gills.

A standard fishing line is next inserted through the bait protecting cover and then, if used, through the hook-shield with the narrow end of each facing away from the end of the line. The line is then either tied into a loop or a standard crimp for fishing line is used to form a loop.

The line is then connected to the baited hook by slipping the loop into the open-eye of the hook. In an embodiment with a hook-shield, the loop and line is secured into the open-eye of the hook by sliding the rear of the hook-shield over the open-eye of the hook. In an embodiment without a hook-shield, the loop and line is secured into the open-eye of the hook by moving the closing mechanism along the shaft and towards the open-eye until the open-eye is closed. An optional tack may be used to further secure the open-eye to the loop by inserting said tack into the side of the hook-shield and through the open-eye of the hook.

Where the hook-shield is used, it is then secured to the bait by inserting the bait-holding pin into the bait. In one presentation, the pin of the hook-shield is inserted into the head of a minnow from the gills through to the top of the head between the eyes.

Finally, the bait protecting cover is slid over the head of the bait completing the Easy Rig Bait Tackle and protecting the bait from premature deterioration.

Once fully assembled, the rig allows for the accurate and life-like presentation of dead or artificial bait. The parts work in unison to hold each other in place and securely attached to the line. Yet, the bait may be quickly removed by reversing the process and sliding off the bait protecting cover, detaching the hook-shield, and sliding the loop and line out of the open-eye of the hook. The hook can then be reused or a new hook attached to re-bait.

BRIEF DESCRIPTION OF THE DRAWINGS (ORIGINAL)

These and other features and advantages of the present invention will become more readily appreciated as the same becomes better understood by reference to the following detailed description when considered in connection with the accompanying drawings, wherein:

FIG. 1 is an orthogonal view of one embodiment of the subject invention fully assembled without bait.

FIG. 2 is a cut away orthogonal view of one embodiment of the subject invention showing the invention fully assembled without bait.

FIG. 3 is an orthogonal view of the basic parts of one embodiment of the invention. The bait protecting cover and hook-shield are shown threaded onto the fishing line and ready for rigging.

FIG. 4 is a perspective view of the open-eye hook and hook-shield combination.

FIG. 5 is an orthogonal view of one embodiment of the subject invention assembled with bait and featuring an elastic band for weedless fishing.

FIG. 6 is an orthogonal view of one embodiment of the bait protecting cover of the subject invention, said bait protecting cover featuring a bait holder.

FIG. 7 is an orthogonal view of one embodiment of the bait protecting cover of the subject invention, said bait protecting cover featuring a bait holder and an indented groove for attaching a skirt or other attractant.

FIG. 8 is an orthogonal view of the basic parts of one embodiment of the open-eye tackle and hook-shield.

FIG. 9 is a cut away orthogonal view of an assembled open-eye tackle and hook-shield holding a standard hook to a line.

FIG. 10 is an orthogonal view of one embodiment of the open-eye hook and integrated closing mechanism, in the open position, and with optional nail and band attachment mechanism.

FIG. 11 is an orthogonal view of one embodiment of the open-eye hook and integrated closing mechanism in the closed position.

FIG. 12 is an orthogonal view of one embodiment of the open-eye hook and integrated closing mechanism rigged onto a bait minnow.

DETAILED DESCRIPTION OF THE INVENTION (ORIGINAL)

Darrell Andrew Joye, Robert Pickney Elliott, and Michael Carter Gibson have invented an Easy Rig Bait Tackle with a bait protecting cover.

This is an easy to rig fishing tackle designed to allow the bait (40) to be attached to the hook (11) and then the hook (11) attached to the line (14) at a loop (21) in the line created by either a knot or a crimp (20) without need for additional tackle or tying and untying of line (14). The open-eye (17 and 18) of the hook (11) is held onto the loop (21) by a hook-shield (16) that slides over the open-eye (17 and 18) of the hook (11) and holds the same with friction. For further security, a tack (22) can be pushed into the hook-shield (16) and through the open-eye (17 and 18) of the hook providing extra security against loss. The hook-shield (16) is then secured to the bait via a pin (15) extruding approximately perpendicular from the hook-shield (16). Next the bait protecting cover (13) slides over the head of the bait (40) until the tip of the pin (15) comes to rest on the inside of the bait protecting cover (13) providing protection of the bait (40) and preventing premature deterioration.

One core of the subject invention is the coupling method of an open-eye (17 and 18) on a hook (11) or other tackle and a hook-shield (16) to allow for easy attachment and detachment of the hook (11) or other tackle from the line (14) without tying knots or working a mechanical unit.

The open-eye (17 and 18) consists of a first "U" bend (18) which turns the shaft of the hook (11) approximately parallel to itself and a second "U" bend (17) which turns the leg opposite the hook (11) of the first "U" bend (18) back towards the first "U" bend (18) and between the two legs of the first "U" bend (18). Once formed, the first "U" bend (18) and the second "U" bend (17) share a common leg, which is approximately or substantially parallel to the opposite legs of each respective "U" bend. The end of the shaft, which is the end of the leg of the second "U" bend (17) that is opposite the common leg, is between the two legs of the first "U" bend (18). The end of the shaft is also between the first "U" bend (18) and the second "U" bend (17). This dual "U" bend open-eye (17 and 18) acts as an eye without closure. Together the dual "U" bend open-eye (17 and 18) can be referred to as the connecting end of the fishing tackle device as it allows for connection to a line or other tackle. The shape of the open-eye (17 and 18) could also be described as an oblong coil where the lead end extends to a hook (11) or attaches to any other tackle. While the formation of the open-eye (17 and 18) has been described as being formed from a hook (11), it could be created from any other tackle where a shaft is used. The distal end of the fishing tackle device, that is the end opposite the connecting end that contains the open-eye (17 and 18), can be referred to as the tackle end as this is where the tackle is attached or built in.

In one embodiment, the open-eye (17 and 18) is integral to a hook (11) replacing the typical circular eye. In another embodiment, the open-eye (17 and 18) can be attached to any fishing tackle the user desires to quickly connect or disconnect. Such embodiment could include the open-eye (17 and 18) on the end of a leader or other non-hook tackle. In yet another embodiment, as shown in FIGS. 8 and 9, the open-eye (17 and 18) is integrally formed with a standard circular eye (81) at the opposite end of the shank, and the standard circular eye can be connected permanently to a fishing line (14) with the open-eye (17 and 18) free to serve as a receptacle to which any standard circular eye or loop can be connected.

The hook-shield (16) features two distinct parts. The front (30) and rear (31) of the hook-shield (16) are attached in tandem along the longitudinal axis and may either be integrally formed together or permanently affixed to one another. In a common embodiment a third part, a pin (15), protrudes roughly perpendicular from the longitudinal axis of the hook-shield (16) and is affixed to the front (30) and rear (31) combination of the hook-shield (16). A hole runs through-and-through the hook-shield (16) along the longitudinal axis from the front (30) to the rear (31) and is appropriately sized to allow for the free passage of normal fishing line (14).

The front (30) of the hook-shield (16) is constructed out of a solid material to provide strength and structure. Where desirable, the material may be chosen to also act as a weight. Such material may include stiff plastics, metal, fiberglass, carbon fiber, wood, or any material usable in injection molds.

The rear (31) of the hook-shield (16) is hollow. The open-eye (17 and 18) of the hook (11), or other tackle, and the hollow rear (31) of the hook-shield (16) are so sized that the open-eye (17 and 18) fits snuggly into the hollow rear (31) of the hook-shield (16). To achieve this, the hollow rear (31) of the hook-shield (16) is constructed out of a strong but pliable or elastic material such as, but not limited to, rigid rubber and plastic.

The pin (15) extrudes from the surface of the hook-shield (16) roughly perpendicular from the longitudinal axis of the front (30) and rear (31) combination of the hook-shield (16). Said pin (15) may be integral to the hook-shield (16) or may be a separate part permanently affixed into an appropriate sized receptacle in the hook-shield (16). The pin (15) allows the hook-shield (16) to be secured to the bait (40) ensuring that the hook-shield (16) does not slide up the line (14) allowing the open-eye (17 and 18) to come loose from the tackle.

In an alternative embodiment, the hook-shield (16) may be secured to the open-eye (17 and 18) by a tack (22) that is pushed into the hook-shield roughly perpendicular to the longitudinal axis of the front (30) and rear (31) and through the open-eye (17 and 18) of the hook (11). The tack (22) can pierce the hook-shield (16) with sufficient force, but is held in place by friction.

In another alternative embodiment, the hook-shield (16) may be replaced entirely by including a closing mechanism (101) integral to the fishing tackle containing the open-eye (17 and 18). The shaft of the hook (11) that forms the open-eye (17 and 18) runs through a hole in the elongate-axis of the closing mechanism (101). The closing mechanism (101) consists of a weight, bead, or other object which the shaft runs through, and a means of securing the closing mechanism (101) to the shaft of the hook (11) or other fishing tackle. This means of securing the closing mechanism (101) to the shaft may be friction created by the use of an O-ring or other device, or may be threading the shaft and the closing mechanism (101) so they act together in a screw motion. The methods of securing the closing mechanism (101) to the shaft allows for continuous movement, naturally gradated, of the closing mechanism (101) along the shaft from an open position to a closed position. In a preferred embodiment, as shown in FIGS. 10 and 11, the closing mechanism (101) bears a shape, such as a cone, that facilitates the filling of the gap in the open-eye (17 and 18). The closing mechanism (101) slides along the shaft and when slid away from the open-eye (17 and 18) leaves space in which the loop of a line may be slipped into or out of the open-eye (17 and 18). When the closing mechanism (101) is slid towards the open-eye (17 and 18), it fills the gap between the second "U" bend (17) and the shaft of the hook (11). The shape of the open-eye (17 and 18) is forgiving in that deformation of the open-eye (17 and 18), either by stretching out the first U-shaped bend (18) or in squeezing it together, does not prevent the closing mechanism (101) from functioning. The shape of the closing mechanism (101), in conjunction with its continuous movement along the shaft, allows it to be stopped short to close a narrower gap in the open-eye (17 and 18) or slid further towards the open-eye (17 and 18) to close a wider gap. The fishing tackle containing the open-eye (17 and 18) may also feature an integrated stop (102) on the shaft of the hook (11) positioned on the shaft opposite the end with the open-eye (17 and 18). The stop (102) is positioned on the shaft of the hook (11) so as to prevent the closing mechanism (101) from moving farther than necessary to open the open-eye (17 and 18). While discussed in use on a hook (11), the attachment mechanism of an open-eye (17 and 18) and closing mechanism (101) may be used on other fishing tackle.

A common embodiment of the invention, with all the optional parts, may be assembled and used as follows.

The fishing line (14) is run through the hook-shield (16) from the point (30) of the hook-shield (16) out the hollow rear (31) of the hook-shield (16). A loop (21) is then formed in the line (14). Said loop (21) can be formed in the line (14) in any number of ways including by tying a knot or crimping the line to itself (20).

The hook (11) is thread into the baitfish by inserting the open-eye (17 and 18) into the vent and running it out of the mouth or between the lower gills of the fish. The hook (11) may alternatively be attached to a bait by running the point and barb (19) of the hook (11) through the bait at the desired place.

The loop (21) in the line (14) is slipped into the open-eye (17 and 18) between the shaft and the free leg of the second "U" bend (17). The open rear (31) of the hook-shield (16) is moved down the line (14) and slipped over the open-eye (17 and 18) of the hook (11), and the line (14) is pulled tight to remove any excess. The snug fit of the open-eye (17 and 18) of the hook (11) into the hollow rear (31) of the hook-shield (16) prevents the loop (21) from sliding out of the first "U" bend (18) of the open-eye (17 and 18) of the hook (11). The hook (11) or tackle is thereby secured to the line (14). The tack (22) may then be inserted into the hook-shield (16) and through the open-eye (17 and 18) to further secure the line (14) to the hook (11).

The pin (15) of the hook-shield (16) is pushed into the bait (40) to secure the bait (40) to the hook-shield (16). In one embodiment with the use of a minnow, as shown in FIG. 5, the pin (15) is pushed into the head of the minnow from the bottom up through the top of the head between the eyes. In this manner, the bait is secured to the hook-shield (16) and prevented from shifting on the hook (11).

A common embodiment of the invention with hook and integrated closing mechanism may be assembled and used as follows.

A loop (21) is formed in the fishing line (14). Said loop (21) can be formed in the line (14) in any number of ways including by tying a knot or crimping the line to itself (20).

The closing mechanism (101) on the hook (11) is moved forward until contact is made with the open-eye (17 and 18) and the open-eye (17 and 18) is closed. The hook (11) is then thread into a baitfish by inserting the open-eye (17 and 18) into the vent and running it out of the mouth or between the lower gills of the baitfish. The hook (11) may alternatively be attached to a bait by running the point and barb (19) of the hook (11) through the bait at the desired place. Once the hook (11) is in place, the closing mechanism (101) is moved rearward away from the open-eye (17 and 18) until the open-eye (17 and 18) is open and the closing mechanism (101) contacts the stop (102).

The loop (21) in the line (14) is slipped into the open-eye (17 and 18) between the shaft and the free leg of the second "U" bend (17). The closing mechanism (101) is then returned to the closed position by sliding it forward towards the open-eye (17 and 18) until it completes and closes the open-eye (17 and 18). The hook (11) or tackle is thereby secured to the line (14).

A nail (104) may then be pushed partially into the head of the bait (40). A elastic band (103), or other securing device, is then looped onto the nail (104), around the bait (40), and looped back onto the nail (104). The nail (104) is then inserted the remainder of the way into the head of the bait (40). The elastic band (103) may also feature an integrated eye to accept the nail (104), and in such embodiment, the nail (104) is thread through the integrated eye in the elastic band (103) prior to inserting the nail (104) into the bait (40). In this manner, the bait is secured to the hook (11) and prevented from shifting.

While the tackle may be used as described in either embodiment above, the subject invention offers a further enhancement in the form of a bait protecting cover (13). The bait protecting cover (13) is a cone shaped, hollow shell made of a stiff material. Said material may include, but is not limited to plastics, metal, or any other material that may be appropriately molded or formed. The bait protecting cover (13) may be made transparent or opaque as desired, and may feature decorative ornamentation such as faux eyes. The bait protecting cover (13) comes to a narrow-point (53) at the front. Said narrow-point (53) is pierced with a hole appropriately sized to allow the free passage of fishing line (14) but narrow enough to effectively block the flow of water into the bait protecting cover (13). The bait protecting cover (13) extends cone like from the narrow-point (53) to the wide rear opening (54). Said rear opening (54) is sized to fit snuggly over the bait (40), hook (11), and hook-shield (16) combination.

The bait protecting cover (13) is threaded onto the line (14) prior to forming the loop (21) in the line (14). If a hook-shield (16) is used, the hook-shield (16) is thread onto the line (14) after threading the bait protecting cover (13) onto the line (14) and before forming the loop (21) in the line (14). The line (14) is threaded through the hole at the narrow-point (53) of the bait protecting cover (13) and out the rear opening (54) of the bait protecting cover (13).

After assembling the bait (40), hook (11), and hook-shield (16) as previously described, the bait protecting cover (13) is slid down the line towards the bait (40) until the tip of the bait (40), hook (11), and hook-shield (16) are slid into the rear opening (54) and securely lodged within the bait protecting cover (13). The bait protecting cover (13) is slid onto the bait (40), hook (11), and hook-shield (16) combination until the tip of the hook-shield (16) is lodged into the narrow-point (53) of the bait protecting cover (13) and the pin (15) of the hook-shield (16) is lodged into the bait protecting cover (13).

In an embodiment of the invention without a hook-shield (16), the bait protecting cover (13) is slid down the line (14), towards and onto the bait (40) and hook (11) combination, until the open-eye (17 and 18) of the hook is lodged into the narrow-point (53) of the bait protecting cover (13).

In another embodiment of the invention, the tackle may be made weedless by attaching an elastic band (12), such as a rubber band, to the hook (11). One end of the elastic band (12) is attached to the second "U" bend (17) of the open-eye (17 and 18) and the other end is attached to the barb (19) of the hook (11). This step is completed after placing the loop (21) into the open-eye (17 and 18) and securing it in the first "U" bend (18) of the open-eye (17 and 18) and before sliding the hook-shield (16) down the line (14) and over the open-eye (17 and 18) of the hook (11). After attaching the elastic band (12) the remaining parts of the Easy Rig Bait Tackle may be assembled as described above.

In an alternative weedless embodiment of the invention, the hook (11) may be imbedded within the bait (40) such that the hook (11) is shielded from snagging weeds. Such embodiment is shown in FIG. 12.

In another embodiment of the invention, the bait protecting cover (13) may include a bait-holder (50) attached to the bait protecting cover (13) near the narrow-point (53) in a hinged manner (51). The free, pivoting end of the bait-holder (50) features a spiked point (52) that is pushed through the bait protecting cover (13), or a hole in the same, and into the bait (40). Thus the bait-holder (50) securely attaches the bait (40) to the bait protecting cover (13) preventing the bait (50) from coming out of the rear opening (54) of the bait protecting cover (13).

In another embodiment of the invention, the bait protecting cover (13) may include an indented groove (60) around the outside circumference of the bait protecting cover (13) near the rear opening (54) of the bait protecting cover (13).

Said groove (60) serves as a place to attach a skirt or other attractant to the bait protecting cover (13), and said attractant may be attached by use of a rubber band, O-ring, or other means designed to securely hold the attractant within the indented groove (60).

The user may readily disassemble the Easy Rig Bait Tackle by reversing the steps to assemble. The bait protecting cover (13) and hook-shield (16) may be left on the line (14) and the loop (21) left in place. The hook (11) or other tackle is removed by sliding the loop (21) between the shaft and the free leg of the second "U" bend (17). The hook (11) may be re-baited, or an alternative piece of tackle used. The hook (11) or other tackle is then attached to the line (14) at the loop (21) in the manner described above, the hook-shield (16) slid into place and the pin (15) inserted into the bait (40), and the bait protecting cover (13) slid over the assembly until resting upon the open-eye of the hook (17 and 18) or the leading front of the hook-shield (16). Upon re-assembly, the Easy Rig Bait Tackle is ready for use again.

What is claimed is:

1. A fishing tackle device configured to attach to a fishing line, comprising:
   a) a shaft with a tackle end and a connecting end, where the connecting end is bent into a first U-shape with the first leg of the first U-shaped bend running straight to the tackle end and the second leg of the first U-shaped bend being further bent into a second U-shape, facing the first U-shaped bend, with the first leg of the second U-shaped bend being shared with the second leg of the first U-shaped bend and the second leg of the second U-shaped bend being substantially parallel to the shared leg of the first and second U-shaped bend and terminating between the two U-shaped bends and between the legs of the first U-shaped bend and leaving a gap between the shaft and the second leg of the second U-shaped bend;
   b) a closing mechanism on the shaft between the tackle end and the first U-shaped bend that moves in a continuous gradated nature between an open position nearer the tackle end and a closed position towards the first U-shaped bend, where the closing mechanism has a top end nearest to the first U-shaped bend, a distal end opposite the top end, and the closing mechanism top end is wedge shaped such that as the closing mechanism is moved towards the closed position the closing mechanism protrudes further radially from the shaft within the connecting end between the first U-shaped bend and the second U-shaped bend and progressively fills the gap between the shaft and the second leg of the second U-shaped bend.

2. The fishing tackle device in claim 1 where the tackle end of the shaft forms a hook.

3. The fishing tackle device in claim 1 where the tackle end of the shaft is other fishing tackle.

4. The fishing tackle device in claim 1 where the tackle end of the shaft connects to any other tackle.

* * * * *